H.W. FODDY
C.C. HEBERT
INVENTOR.

H. W. FODDY
C. C. HEBERT
INVENTOR.

United States Patent Office 2,881,748
Patented Apr. 14, 1959

2,881,748

FUEL INJECTOR CONTROL

Harold W. Foddy, Dearborn, and Clarence C. Hebert, Allen Park, Mich., assignors to Ford Motor Company, Dearborn, Mich., a corporation of Delaware Application September 3, 1957, Serial No. 681,657

16 Claims. (Cl. 123—179)

This invention relates to an internal combustion engine fuel injector control, and more particularly to a control means for providing priming fuel, fast idle, and enriched mixture responsive to engine temperature and load.

It is intended that this invention be used with a vacuum-controlled fuel injection distributor of the kind described in U.S. application, Serial Number 622,973 filed November 19, 1956, in the name of Paul E. Braun and assigned to the assignee of this invention.

It is a principal object of our invention to supply priming fuel directly into the intake manifold of an engine during cranking by an electric starter, and to regulate the quantity of such fuel in accordance with engine temperature. It is also an object to provide priming fuel to an engine at a rate which is independent of cranking speed.

A further object is to provide an infinitely variable temperature-responsive fast idle arrangement operable during cold engine running.

Another object of this invention is to provide a temperature-corrected, load-responsive signal to a vacuum-controlled fuel injector.

A further object is to provide a primer having a purging arrangement whereby the primer may be disabled in case of engine flooding.

A further object is to provide a mechanism for effecting the functions of fast idle, priming, and enriched running operated by a single temperature-sensitive element.

A still further object of our invention is to provide a fuel injection control unit which supplies the engine with increased fuel variable to match the engine's requirements during warm-up.

Further objects and advantages of our invention will become apparent from the following description in which.

Figure 1:
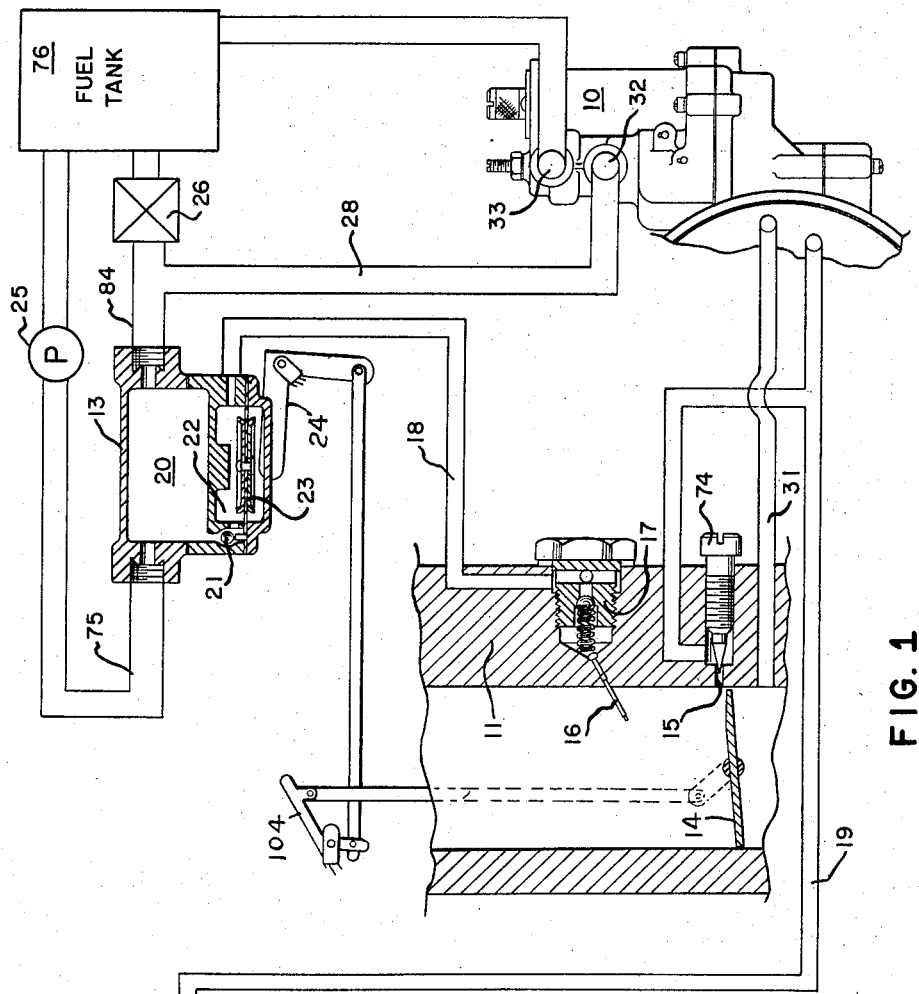
Figure 1 is a layout drawing showing the relationship of our invention to the fuel injector.

Referring first to Figure 1 a throttle body is shown generally at 11 and it contains a butterfly throttle plate 14 operated by an accelerator pedal 104 in the well known manner. A vacuum bleed down jet 15 is positioned within body 11 to be uncovered only when throttle plate 14 is substantially closed in the idle position as shown. The effective opening of this jet is controlled by needle 74 threadably received in throttle body 11, and operates to control the idle mixture in a manner that will be subsequently explained. Bleed down jet 15 is in communication with vacuum control line 19, one branch of which leads to injector 12 and the other branch leads to a control unit shown generally at 10.

Throttle body 11 also receives priming nozzle 16 which discharges above the throttle plate and which is fed from fuel priming line 18 through a spring-loaded ball check valve 17. Priming nozzle 16 performs the dual functions of a primer prior to engine starting and an accelerator pump jet during engine operation, as will be more fully explained.

A flow-through accelerator pump 13 is positioned in fuel line 75 to continuously receive fuel from pump 25. Chamber 20 is normally filled with fuel. Check valve 21 is normally open, as shown, and fuel fills chamber 22 above diaphragm 23. Diaphragm 23 may be moved by lever 24 to displace a portion of the volume of chamber 22, and the fuel pressure will close valve 21 and open check valve 17 to flow through nozzle 16. Lever 24 is operated with an accelerator pedal 104 in the well known manner to cause a displacement of chamber 22 concurrent with the opening of throttle plate 14. Therefore, fuel is supplied directly to the intake manifold upon acceleration to compensate for the normal time lag of the fuel metering system.

Fuel line 84 is discharged to the fuel tank 76 through a normally open solenoid valve 26. Solenoid 26 is connected to the starter switch (Fig. 5) to be energized and thereby closed during the cranking of the engine. A parallel discharge path 28 leads through control unit 10 and controls the fuel pressure in priming line 18 upon cranking of the engine as will be subsequently explained.

The control unit 10 provides a vacuum signal through vacuum control line 19 to diaphragm control chamber 29 of injector 12. A primary vacuum line 31 provides manifold vacuum to control unit 10.

Injector 12 has a rotor 90 driven by shaft 91 at the engine camshaft speed. A metering piston 92 operates to form the charge in chamber 93 which is then sent in succession through outlets 94 to the injectors. Fuel is supplied under pressure to the piston chamber 93 through inlet 95. The amount of the charge is controlled by the position of rod 96 in accordance with its position on cam 30. The movement of cam 30 is effected by control chamber 29. The injector 12 per se forms no part of this invention and is illustrated to fully describe the manner by which control unit 10 effects control of an injector unit.

Figure 2:
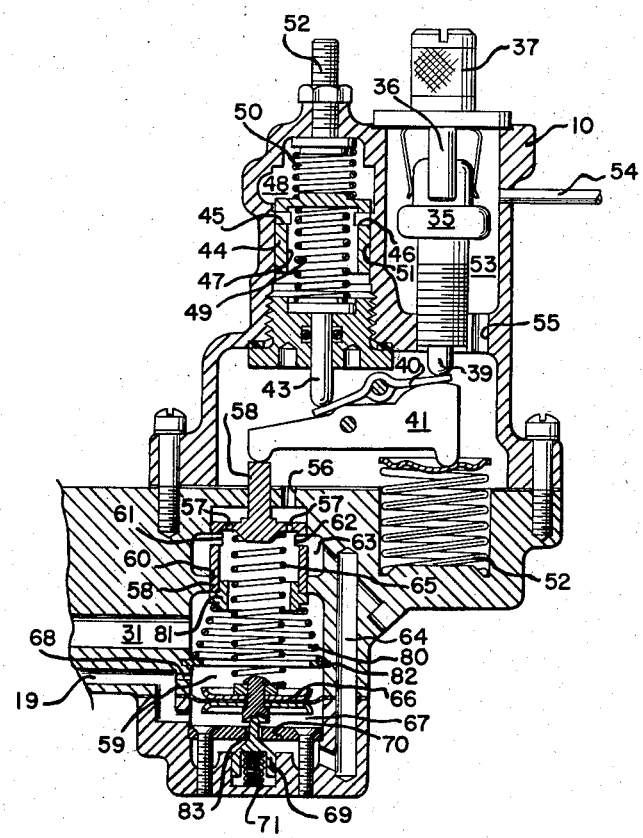
Figure 2 is a cut-away view of the thermostat control.

With reference to Figure 2, a thermostat or temperature capsule 35, shown in the cold position, is threadably held in body 10 and may be rotated for adjustment by thermostat clip 36 and clip retainer 37. Thermostat 35 may preferably be of the positive displacement type actuated by a change in the physical state of matter as fully described in U.S. Patents 2,259,846, 2,265,586 and 2,769,-597. Tip 39 of thermostat 35 moves axially therewith as a function of temperature. Movement of tip 39 is transmitted through levers 40 and 41 to plungers 43 and 58 respectively against the resistance of spring 50.

Figure 3:
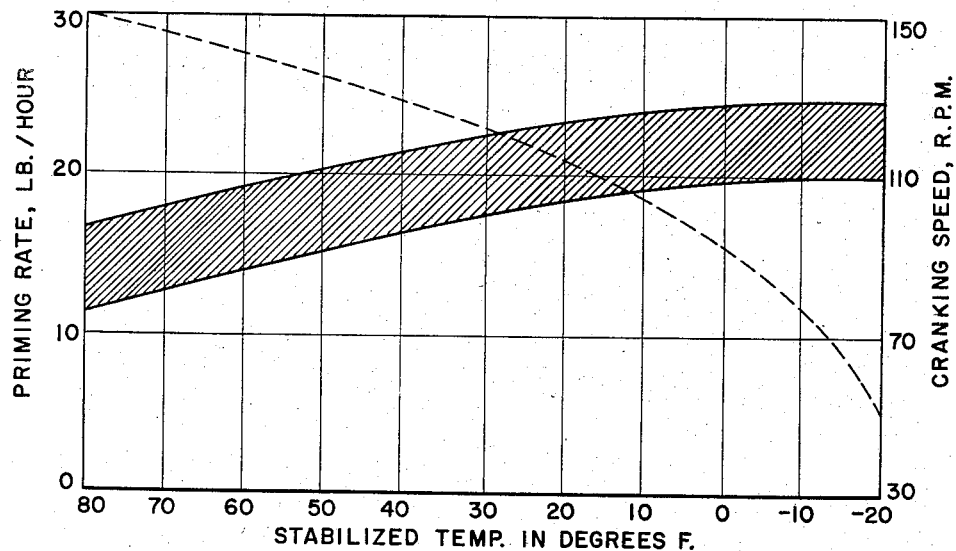
Figure 3 is a graph showing the relationship of priming rate temperature and cranking speed.

Plunger 43 and the associated mechanism above it provide fuel to priming nozzle 16 during cranking, and control the quantity of such fuel in accordance with engine temperature. An example of this relationship of fuel to engine temperature is shown in Figure 3 wherein priming rate in pounds per hour is plotted on the ordinate and stabilized temperature on the abscissa. Stabilized temperature is taken as the common soak temperature of ambient air and engine. The priming rate is the quantity of fuel in pounds per hour supplied during engine cranking. The shaded portion of Figure 3 represents an example only of the rate at which fuel may be supplied to an automobile engine to produce starts at the temperatures indicated. The superimposed broken line represents engine cranking speeds which may be expected over the indicated temperature range. The speeds in r.p.m. are indicated at the right of the chart. Although this invention provides priming fuel at a rate that is independent of cranking speed, it is necessary to be aware of the change in cranking speed with temperature in order to supply the quantity of fuel that will produce satisfactory starts for the particular equipment involved.

A fuel bypass valve 44 takes the form of a piston defining bypass slots 45 and 46 which permit fuel to flow from chamber 47 within and below valve 44 to chamber 48 above valve 44. Chamber 47 is in communication with fuel at the priming pressure through inlet 32 (Figure 1) and chamber 48 empties into the fuel tank through outlet 33 (Figure 1). Valve 44 is in equilibrium between springs 49 and 50 and it may reciprocate within bore 51 to cover or uncover slots 45 and 46. Pump 25 (Figure 1) may consist of an electric fuel pump to provide priming fuel at preferably 15 to 20 p.s.i. maximum from tank 76. A force which varies with temperature is applied to valve 44 through spring 49 by the axial movement of plunger 43.

As mentioned before, solenoid valve 26 is closed during cranking and the fuel pressure in line 28 is thus regulated by the movement of valve 44. This fuel pressure is transmitted through accelerator pump 13, past check valve 17 to nozzle 16. Since nozzle 16 has a fixed orifice, the priming rate is approximately proportional to the square root of the fuel pressure within chamber 47. Check valve 17 prevents flow through nozzle 16 at the nominal line pressure of two or three p.s.i. when solenoid valve 26 is opened, as during engine operation.

Adjustable plunger 52 is threadably received within body 10 and bears against upper spring 50 for calibration and adjustment.

Thermostat 35 is heated by filtered air drawn through an exhaust manifold stove (not shown) through tube 54 to chamber 53 surrounding the thermostat. The heated air is drawn from chamber 53 into the intake manifold, passing down through opening 55 and thence through opening 56 and a pair of openings 57 formed in fast idle valve 58 to manifold vacuum chamber 59.

Fast idle valve 58 is slidably received within bore 60 and is positioned by lever 41. Slots 61 and 62 are cut through valve 58 and cooperate with annulus 63. In the cold position as shown they are fully uncovered and register with annulus 63. Annulus 63 is in communication with vertical passageway 64 which, in turn, opens into the atmosphere, preferably through an air filter (not shown) which may be in common with the intake to throttle body 11. Valve 58, therefore, forms an air bleed into manifold vacuum chamber 59 through slots 60 and 61. The air bled into chamber 59 is equivalent to opening the throttle plate by a small amount and the quantity of air bled determines the rate of idle. Collar 81 is received within valve 58 and serves the purpose of a support for spring 80. Snap ring 82 is received in body 11 and serves to support spring 80 against collar 81. The purpose of spring 80 is to hold valve 58 in engagement with lever 41.

This fast idle arrangement has the advantages of being infinitely variable over its intended range, and being automatically positioned without "cocking" by release of the accelerator pedal as in the case of a cam-operated throttle cocking arrangement.

Spring 65 bears on diaphragm 66 in an amount which varies with temperature as determined by the position of tip 39, except that in the extended position of tip 39, as in a warm engine, spring 65 is not under compression. The compartment 67 below diaphragm 66 is in communication with vacuum control line 19 to injector 12. Compartment 67 is connected to manifold chamber 59 by a bleed orifice 68. A cone-shaped atmosphere bleed valve 69 operates to bleed down the vacuum in compartment 67 when depressed by diaphragm 66. A plate 70 forms one wall of compartment 67 and includes a cooperating orifice 83 within which cone valve 69 operates. A spring 71 holds cone valve 69 against plate 70 in a normally closed position. Tube 31 connects chamber 59 directly to the intake manifold below the throttle plate as shown in Figure 1.

When the engine is warm, the pressure within control compartment 67 closely follows the manifold pressure in chamber 59 by reason of orifice 68 as little or no force is exerted by spring 65 against diaphragm 66. During a sudden increase in pressure in the manifold, as on acceleration, diaphragm 66 may be momentarily flexed to open cone valve 69 and admit air into compartment 67 thereby more rapidly equalizing the pressure by supplementing orifice 68. However, during cold engine operation, it is necessary to provide a richer mixture to the engine through the injectors, and this is done by admitting air at atmospheric pressure from passageway 64 into compartment 67 at a rate controlled by temperature and vacuum. During warm-up, spring 65 bears on diaphragm 66 with a force which increases with decreasing temperature, and cone valve 69 is opened a certain amount according to the displacement of diaphragm 66. At the same time, the diaphragm, being sensitive to the pressure differential across it, will tend to close valve 69 in accordance with the pressure drop across orifice 68 caused by the air being drawn from atmospheric passageway 64 through compartment 67 into intake manifold chamber 59. Thus a balanced condition is achieved whereby the differential pressure across diaphragm 66 is equal to the force imposed on diaphragm 66 by spring 65.

The enriched cold running signal which this invention provides can best be explained by reference to Figure 4 wherein fuel quantity is plotted against manifold vacuum or engine load. Curve A represents a typical fuel curve plotted against load for a fully warmed engine. This curve defines the quantity of fuel per injector stroke that is provided by the distributor 12 (Figure 1) when its control chamber 29 is operated directly by manifold pressure. The slope of this curve is controlled by the profile of cam 30 in distributor 12. Cam 30 has a two-gradient profile 72 and 73, and the change in slope of curve A at point E corresponds to the break in the profile of cam 30. This arbitrary increase in injected fuel quantity provides a richer engine mixture for conditions of high load. Line F represents the maximum delivery capacity of distributor 12.

Curve B is a hypothetical example of enrichment that may be provided by this invention acting through the distributor 12 while the engine is cold. As the engine warms up, the operation of cone valve 69 by diaphragm 66 is such that curve B will coincide with curve A when the engine temperature has reached the point where spring 65 no longer acts upon diaphragm 66, and the distributor 12 received direct manifold pressure.

The exact function of diaphragm 66 can best be understood by first considering the operation of a vacuum bleed valve, such as cone valve 69, without the diaphragm but being directly actuated by a function of temperature, such as through spring 65. For a given cold temperature requiring vacuum correction, the vacuum bleed valve would be opened by a fixed amount. During conditions of high engine vacuum, the pressure difference between the manifold and the control compartment 67 would be greater than at low manifold vacuum. There would be no pressure difference between these chambers at zero manifold vacuum. Since it is this difference in pressure that provides the desired enrichment, it is necessary to maintain this pressure difference somewhat constant. This is the function of diaphragm 66.

Diaphragm 66 responds to the pressure difference between manifold chamber 59 and control compartment 67; and since the pressure in control compartment 67 exceeds the manifold pressure at all times while valve 69 is open, the resultant force on the diaphragm is upward in opposition to spring 65. It is apparent that under conditions of high engine vacuum, this force tends to raise the diaphragm against spring 65 and permits valve 69 to close by a small amount. Conversely, when the manifold vacuum decreases to only a few inches of mercury, such as under high load, the force difference tending to hold the diaphragm up will diminish and valve 69 will be opened to admit more air, thereby tending to maintain a fixed pressure difference between the manifold and the control chambers for a given temperature.

Figure 4:
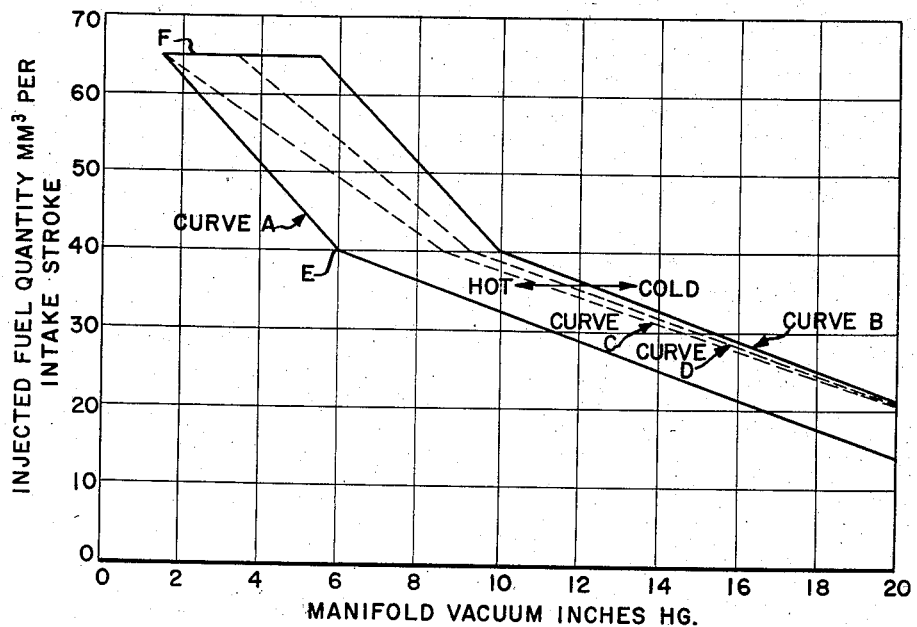
Figure 4 is a graph showing the relationship of fuel charge, load, and temperature; and, Figure 5 is an electrical schematic of the fuel purging system.

Curves A and B of Figure 4 have been taken to represent a constant 4" Hg pressure difference. Actually, curve B may not be obtained in practice, as some pressure differential is required to move the diaphragm. However, such parallelism between curves A and B may not be desired for an engine's particular cold running requirements. Curves C and D represent two variations of curve B, curve D being obtained by providing an orifice 68 with a relatively small opening, and curve C being the result of using a larger orifice 68. This is understood when it is remembered that the pressure difference between the control chamber 67 and the manifold chamber 59 is a function of the pressure drop across orifice 68. As an example, an orifice diameter of 40 thousandths of an inch has been successfully used. Curves B, C and D would coincide at the point of zero pressure or approximately thirty inches of vacuum.

It is, therefore, seen that an enrichment curve may be provided which is controlled by temperature and load, and the slope of which may be varied to satisfy the requirements of a particular engine for cold running.

Bleed down jet 15 (Figure 1) becomes operative when uncovered by the throttle plate in idle position and thereby opened to atmospheric pressure. When the throttle plate is advanced above jet 15 the jet is subjected to manifold vacuum, or something near to it, and is therefore inoperative. Needle 74 may be adjusted to bleed down the vacuum within the distributor control chamber 29 at idle to adjust and control the quantity of fuel injected.

Figure 5:
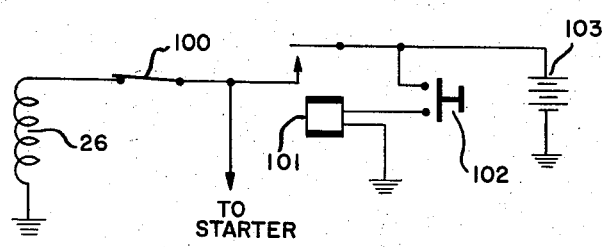

This system is adaptable to a simple purging arrangement in case the engine accidentally becomes flooded during cranking. Such an arrangement is shown in Figure 5 where normally open solenoid valve 26 is connected to the starter circuit through a disconnect switch 100. Battery 103 provides starting power through relay 101 operated by starter push button 102. This circuit is also used to energize valve 26 and close the fuel bypass path as previously described. In case of flooding, disconnect switch 100, which may be operated by complete depression of the accelerator pedal, may be opened to close valve 26, thereby stopping the priming action through nozzle 16.

It is to be understood that the invention is not to be limited to the exact construction shown and described, but that modifications thereto may be made without departing from the spirit and scope of the invention, as defined in the appended claims.

What is claimed is:

1. An internal combustion engine starting primer comprising a source of engine fuel under pressure, a priming nozzle arranged to discharge fuel from said source into an air intake portion of said engine, a controllable relief valve connected to said source to regulate the fuel pressure at said nozzle, a positive displacement temperature responsive means adapted to respond to engine temperature and connected to control said valve to relieve said pressure by an amount increasing with increased engine temperature, and means for removing said pressure from said nozzle upon starting the engine.

2. A device for providing a vacuum signal responsive to load and temperature to a vacuum-controlled fuel injector on an internal combustion engine comprising means defining a first chamber and a second chamber, a common flexible diaphragm between said first and second chambers and movably subject to pressure differences therebetween, an air valve operable by movement of said diaphragm into said second chamber to bleed air therein, means defining a restricted air bleed connecting said first chamber and said second chamber, said first chamber in communication with a source of engine intake manifold pressure, said second chamber in communication with the injector vacuum control, and biasing means responsive to engine temperature operable to urge said valve to admit air with a force which increases with decreased temperature.

3. An engine primer for supplying starting fuel to an internal combustion engine comprising a thermostat responsive to engine temperature, a source of pressurized fuel operable upon actuation of the engine's starting circuit, a primer nozzle connected to receive fuel from said source and adapted to discharge into an intake manifold, a controllable fuel pressure regulator valve connected to said source for regulation of said fuel pressure, said valve controlled by said thermostat to provide increased fuel pressure with decreased engine temperature.

4. A fuel requirements computer for the control of a vacuum motor controlled fuel injector on an internal combustion engine comprising means defining a control chamber, said means including a flexible diaphragm forming a portion of said chamber, one side of said diaphragm being subject to pressure from within said chamber, the other side of said diaphragm in communication with a source of engine intake manifold pressure, means defining a restricted bleed orifice bypassing said diaphragm, valve means associated with said chamber and adapted to be opened by displacement of said diaphragm into said chamber to admit air therewithin, thermostat bias means urging said diaphragm to open said valve means with a force which increases with decreased engine temperature, said control chamber in communication with the vacuum motor control of a fuel injector, whereby the pressure within said control chamber is a function of engine load and temperature.

5. A control unit for modifying a manifold vacuum signal in accordance with an engine's air to fuel requirements during engine warm-up comprising a manifold vacuum portion, an intermediate control portion, an atmospheric portion, communication means connecting said vacuum portion and said control portion, variable valve means connecting said atmospheric portion to said control portion, pressure operated means urging said valve means to close by a force proportional to the amount which the absolute pressure in the control portion exceeds the absolute pressure in the manifold portion, and thermostatic means urging said valve to open by a force which increases with decreased engine temperature.

6. A fuel priming and control system for fuel injecton equipped engines wherein the fuel injection is controlled by a vacuum motor comprising adjustable means for adding fuel directly to the engine's air induction system, an engine temperature responsive thermostat, said adjustable means controlled by said thermostat, means defining a vacuum chamber in communication with the vacuum motor on said fuel injection and including an adjustable air valve, said adjustable air valve controlled by said thermostat.

7. A control unit for a pressure controlled fuel injector on an internal combustion engine comprising a body portion defining a fuel inlet and a fuel outlet, means including a restricted portion for supplying fuel directly to said engine from said inlet, a bypass piston slidably mounted within said body and interposed between said inlet and said outlet, engine temperature responsive means, said piston slideably operable by said temperature responsive means to bypass fuel from said inlet to said outlet, said body further defining a pressure chamber in communication with the control on said injector, a pressure bleed valve in communication with said chamber, said valve operable by said temperature responsive means.

8. A control unit for modifying a manifold vacuum signal in accordance with an engine's increased fuel requirements during engine warm up comprising a manifold vacuum portion, and intermediate control portion, and atmospheric portion, means defining a bleed of controlled dimension connecting said vacuum portion and said control portion, normally closed variable valve means connecting said atmospheric portion to said control portion when open, thermostatic means urging said valve to open with a force which increases with decreased engine temperature, and pressure differential means urging said valve to close with a force proportional to the amount which the absolute pressure in the control portion exceeds the absolute pressure in the manifold portion.

9. An internal combustion engine starting primer comprising a source of engine fuel under pressure, a priming nozzle arranged to discharge fuel from said source into an intake portion of said engine, a controllable relief valve connected to said source to regulate the fuel pressure in said nozzle, temperature responsive means adapted to respond to engine temperature and connected to control said valve to relieve said pressure by an amount increasing with increased engine temperature and means for removing the pressure from said nozzle upon starting the engine.

10. A device for providing a vacuum signal responsive to load and temperature to a vacuum-controlled fuel injector on an internal combustion engine comprising means defining a first chamber and a second chamber, a controlled rate pressure equalizing means connecting said first chamber to said second chamber, said first chamber in communication with a source of engine intake manifold vacuum, said second chamber in communication with the injector vacuum control, variable means for admitting air into said second chamber, temperature responsive means operable to urge said variable means to admit air by an amount which increases with decreasing temperature, and pressure differential means responsive to the pressure difference between said chambers operable to resist said temperature responsive means by an amount proportional to said pressure difference.

11. A fuel purging arrangement for an internal combuston engine comprising a source of fuel, a fuel pump connected to receive fuel from said source, a fuel discharge path including an electrical solenoid valve, said path connected to receive fuel from said pump and return fuel to said source when said valve is opened, engine priming means connected to said path between said pump and said valve, electrical means to close said valve when priming is desired and accelerator-operated circuit interrupter means to open said valve in case of engine flooding.

12. In a fuel injection system for an internal combustion engine, a vacuum control chamber, a source of vacuum, a pressure restriction, said chamber connected to said source through said restriction, an air bleed valve arranged to admit air into said chamber when opened, a thermostat responsive to engine temperature, said thermostat arranged to apply an opening force upon said valve which increases with decreasing engine temperature, and pressure differential means responsive to the pressure difference between said source and said chamber and in force opposition to said thermostat whereby the resultant opening force on said valve is the difference between the forces applied by said thermostat and said pressure differential means.

13. In a fuel injection control system for internal combustion engines, pressure controlled means operable to vary the quantity of injected fuel in accordance with a received pressure signal, a source of pressure variable with engine load, means connecting pressure from said source to said pressure controlled means, thermostatic means operable to modify the signal pressure thereby received by said pressure controlled means from said source to provide increased fuel with decreased engine temperature, and means responsive to the pressure difference between said source and said signal pressure and operable to modify said pressure to provide decreased fuel with increased pressure difference.

14. An internal combustion engine starting primer comprising a source of engine fuel under pressure, priming means arranged to discharge fuel from said source into said engine, a controllable relief valve connected to said source to regulate the fuel pressure at said priming means, temperature responsive means adapted to respond to engine temperature and connected to control said valve to relieve said pressure by an amount increasing with increased engine temperature, and electric solenoid means for removing said pressure from said priming means upon starting the engine.

15. A fuel purging system for an internal combustion engine comprising a source of fuel, a fuel pump connected to receive fuel from said source, fuel discharge means including a valve, said means connected to receive fuel from said pump and return fuel to said source through said valve when said valve is opened, engine priming means connected to said discharge means between said pump and said valve, means operable to close said valve when engine priming is desired, and means operable to open said valve in case of engine flooding.

16. A fuel purging arrangement for an internal combustion engine comprising a source of fuel, a fuel pump connected to receive fuel from said source, a fuel discharge path including a solenoid valve, said path connected to receive said fuel from said pump and return fuel to said source when said valve is opened, engine priming means connected to said path between said pump and said valve, means operable to close said valve when priming is desired, and interrupter means operable to open said valve in case of engine flooding.

References Cited in the file of this patent
UNITED STATES PATENTS

| | | |
|---|---|---|
| 1,656,369 | Chandler | Jan. 17, 1928 |
| 1,696,929 | Stokes | Jan. 1, 1929 |
| 2,310,594 | Osburn et al. | Feb. 9, 1943 |
| 2,580,820 | Nardone | Jan. 1, 1952 |